United States Patent
Ha et al.

(10) Patent No.: US 10,463,188 B2
(45) Date of Patent: Nov. 5, 2019

(54) AIRLIFT PUMPING MECHANISM AS WELL AS FLUID CONTAINER AND BREWING MACHINE WITH SUCH AIRLIFT PUMPING MECHANISM

(71) Applicant: Keyway Innovations (Shanghai) Company Limited, Shanghai (CN)

(72) Inventors: Wan Kei Ricky Ha, Shanghai (CN); Nicolas Philippe Roux, Shanghai (CN); Karen Wai Wan, Shanghai (CN)

(73) Assignee: KEYWAY INNOVATIONS (SHANGHAI) COMPANY LIMITED, Shanghai (CN)

( * ) Notice: Subject to any disclaimer, the term of this patent is extended or adjusted under 35 U.S.C. 154(b) by 49 days.

(21) Appl. No.: 15/327,217

(22) PCT Filed: Jul. 10, 2015

(86) PCT No.: PCT/CN2015/083754
§ 371 (c)(1),
(2) Date: Jan. 18, 2017

(87) PCT Pub. No.: WO2016/008388
PCT Pub. Date: Jan. 21, 2016

(65) Prior Publication Data
US 2017/0290455 A1 Oct. 12, 2017

(30) Foreign Application Priority Data

Jul. 18, 2014 (CN) .......................... 2014 1 0345743

(51) Int. Cl.
*A47J 31/04* (2006.01)
*A47J 31/56* (2006.01)
*A47J 31/053* (2006.01)

(52) U.S. Cl.
CPC ............. *A47J 31/04* (2013.01); *A47J 31/053* (2013.01); *A47J 31/56* (2013.01)

(58) Field of Classification Search
None
See application file for complete search history.

(56) References Cited

U.S. PATENT DOCUMENTS

| 3,715,567 | A | * | 2/1973 | Mandziak | A47J 27/21108 |
| | | | | | 219/437 |
| 3,991,664 | A | * | 11/1976 | Yamato | A47J 31/053 |
| | | | | | 99/310 |

(Continued)

FOREIGN PATENT DOCUMENTS

| CN | 1409616 A | 4/2003 |
| CN | 102440686 | 5/2012 |

(Continued)

OTHER PUBLICATIONS

PCT/CN2015/083754 International Search Report.
CN201410345743.2 First Office Action.
CN201410345743.2 Second Office Action.

*Primary Examiner* — Ibrahime A Abraham
*Assistant Examiner* — Gyounghyun Bae
(74) *Attorney, Agent, or Firm* — Howard IP Law, PLLC; Jeremy Howard (57) ABSTRACT

This invention discloses an airlift pumping mechanism for a fluid container, which is intended to address the problem of decreasing efficiency of the pumping mechanism when the liquid level in the container is low in the prior art. For this purpose, the airlift pumping mechanism comprises an air compressor and a riser tube assembly, wherein the riser tube assembly is located in a fluid container, and the air compressor is in communication with the riser tube assembly for feeding the compressed air to the riser tube assembly so that the same flows upward through the riser tube assembly (Continued)

together with the fluid in the fluid container. The pumping mechanism is characterized by further comprising a sunken cavity downwardly extending from the inner bottom surface of the fluid container, wherein the sunken cavity is located between the air compressor and the riser tube assembly and is in communication with the air compressor and the riser tube assembly. Due to the downward extension of the sunken cavity from the bottom surface of the container, the submergence ratio of the pumping mechanism can be significantly increased, thereby greatly increasing the pumping efficiency of the pumping mechanism at various liquid levels.

12 Claims, 7 Drawing Sheets (56) References Cited

U.S. PATENT DOCUMENTS

| | | | | |
|---|---|---|---|---|
| 4,309,940 | A | * | 1/1982 | Lowerre, Jr. ........ A47J 31/0573 99/281 |
| 5,222,633 | A | * | 6/1993 | Blake ................ B01F 3/04446 222/179 |
| 5,586,484 | A | * | 12/1996 | Piazza ................ A47J 31/0663 426/433 |
| 5,623,974 | A | * | 4/1997 | Losenno .............. B05B 9/0805 137/511 |
| 5,782,163 | A | | 7/1998 | Chang |
| 5,878,653 | A | * | 3/1999 | Verhoef .............. A47J 31/408 99/287 |
| 5,900,378 | A | * | 5/1999 | Mayer ................ G01N 1/2226 422/68.1 |
| 5,970,850 | A | * | 10/1999 | Piazza ................ A47J 31/303 99/302 P |
| 6,082,247 | A | * | 7/2000 | Beaulicu ............. A47J 31/402 222/146.5 |
| 6,340,808 | B2 | | 1/2002 | Joergensen |
| 9,833,102 | B2 | * | 12/2017 | Peterson ............. A47J 31/002 |
| 2006/0144865 | A1 | * | 7/2006 | Yoshida .............. A47J 41/0033 222/209 |
| 2010/0221394 | A1 | * | 9/2010 | Gaulard ............... F24H 1/162 426/231 |
| 2012/0100259 | A1 | * | 4/2012 | Rapparini ........... A47J 31/3695 426/77 |
| 2013/0189404 | A1 | * | 7/2013 | Ha ..................... A47J 31/00 426/231 |
| 2013/0344205 | A1 | * | 12/2013 | Oh .................... B65D 85/8043 426/232 |
| 2014/0072690 | A1 | * | 3/2014 | Ha ..................... A47J 31/46 426/590 |
| 2014/0087043 | A1 | * | 3/2014 | Ha ..................... A47J 31/053 426/429 |
| 2015/0000533 | A1 | * | 1/2015 | Ha ..................... A47J 31/0615 99/283 |
| 2015/0217986 | A1 | | 8/2015 | Tansey, Jr. |
| 2015/0223635 | A1 | * | 8/2015 | Mulvaney ............ A47J 31/56 99/281 |
| 2015/0250348 | A1 | * | 9/2015 | Kelly ................. A47J 31/002 426/431 |

FOREIGN PATENT DOCUMENTS

| | | |
|---|---|---|
| CN | 203524467 U | 4/2014 |
| CN | 103841862 A | 6/2014 |
| CN | 104116408 | 10/2014 |
| DE | 19738573 C1 | 6/1999 |
| EP | 1238615 | 9/2011 |
| JP | H06209859 A | 8/1994 |
| JP | 07313368 A | 12/1995 |
| WO | 2012046159 A1 | 4/2012 |
| WO | 2013098681 A1 | 7/2013 |

* cited by examiner

AIRLIFT PUMPING MECHANISM AS WELL AS FLUID CONTAINER AND BREWING MACHINE WITH SUCH AIRLIFT PUMPING MECHANISM

This application claims priority from CN 201410345743.2, filed on Jul. 18, 2014, the entire content of which is incorporated herein by reference.

TECHNICAL FIELD

The present application relates to the pumping mechanism, and more particularly to the improvement in the airlift pumping mechanism of a fluid container such as a brewing machine, etc.

BACKGROUND

An airlift pumping mechanism is a type of pumping apparatus that uses compressed air as the propellant for pumping fluid up a riser tube. The structure involved is simple and requires little maintenance for reliable operation. So that the mechanism has wide applications in fields such as mining, oil & gas exploration, agriculture, and wastewater treatment.

Figure 1:
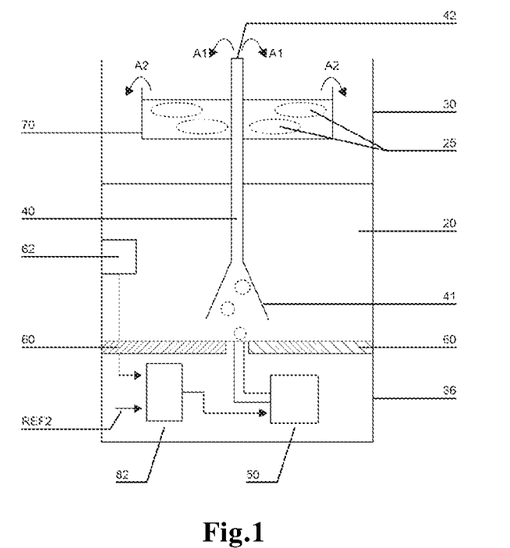
FIG. 1 is a schematic view of the structure of an airlift pumping mechanism in the prior art, wherein the liquid level in the container is high.

WO2012/046159A1 discloses a system that uses an airlift pumping mechanism in an apparatus for applications such as brewing beverages. An embodiment is shown in FIG. 1. The apparatus is generally comprised of a container 30, an air pump 50, a riser tube 40, an infuser 70, a heater 60, a sensor 62, and a control unit 82. The fluid 20 (e.g. water) and ingredients 25 (such as, tea) for the brewing process are placed in the container 30 and infuser 70, respectively. The pumping action is achieved by first activating the air pump 50 to produce compressed air. The generated air will force the fluid 20 up the riser tube 40 and released over the ingredients 25 in the infuser 70 (in the direction of arrow A1). Once the infuser 70 is filled with the fluid 20, the fluid 20 then returns to the container 30 to form a circulative brewing process. The heater 60 located at the bottom 36 of the container 30 provides temperature control during the brewing process. The control unit 82 controls the brewing process according to sensed signals from the sensor 62 and reference signal REF2.

Figure 2:
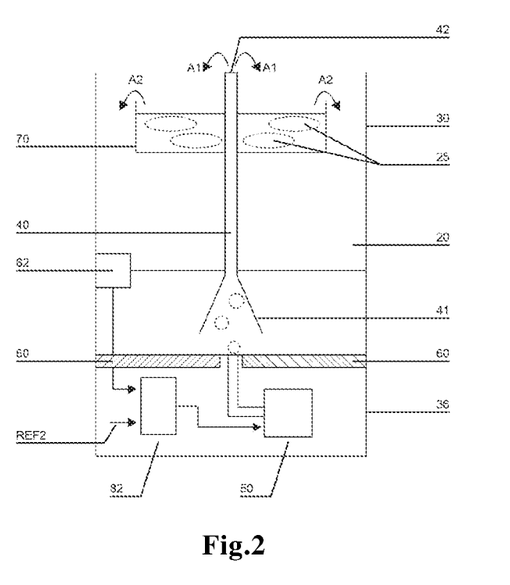
FIG. 2 is a schematic view of the structure of an airlift pumping mechanism in the prior art, wherein the liquid level in the container is low.
Figure 3:
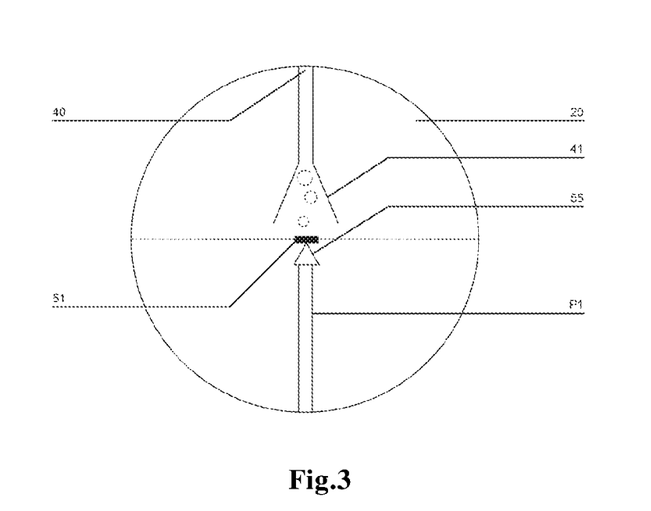
FIG. 3 is an enlarged partial view of the lower part of the riser tube of an airlift pumping mechanism in the prior art.

However, there are some problems with the airlift pumping mechanism in WO2012/046159A1. Specifically, firstly, the pumping efficiency is very low at low residual water volumes (i.e. low liquid levels). The pumping efficiency of the airlift pumping mechanism is in proportion to the submergence ratio defined as $H_w/H_s$, wherein $H_w$ is the liquid level within the riser tube and $H_s$ is the total length of the riser tube. In general, the higher the submergence ratio is, the higher the pumping efficiency will be. In other words, low water levels, as shown in FIG. 2 when compared with FIG. 1, would produce low submergence ratios that would lead to low pumping efficiency or even zero water flow. Such flow rate limitations would negatively impact on the brewing results produced by the system. Secondly, the shape of an air collector has a negative effect on the structural configuration. To more effectively collect and stream the compressed air into the riser tube, a fan-shaped air collector may be used at the lower end of the riser tube (see the sector end 41 in FIG. 1). However, the horizontal spread of the air collector requires certain amount of clearance in space and may interfere with other structural components, thereby limiting options in structural configuration of the system. Furthermore, there is residual fluid remaining inside the air channel. As shown in FIG. 3, the compressed air travels along the air channel P1 and enters the bottom of the container through an opening 51. A one-way valve 55 is placed between the air channel P1 and the opening 51 to prevent backflows of the fluid 20 into the air channel. However, a small amount of residual water may get trapped in the small conduit between the opening 51 and the one-way valve 55. The reason is that even if the container is drained after use, small liquid drops may still remain inside the container and aggregate at the opening. If not completed dried, such residual water may pose a sanitary concern.

SUMMARY OF THE APPLICATION

The present invention aims at solving the above mentioned problems in the prior art. Specifically, the present invention is designed to optimize the structure of the airlift pumping mechanism, so that the pumping efficiency is relative high at various liquid levels, and meanwhile the limitation on the structural construction of the fluid container is eliminated. To this end, the present invention provides an airlift pumping mechanism for a fluid container comprising a novel sunken cavity that extends further downwards from the inner bottom surface of the fluid container so as to considerably increase the submergence ratio and hence the pumping efficiencies at various liquid levels.

In one aspect of the present invention, an airlift pumping mechanism for a fluid container is provided. The airlift pumping mechanism comprises an air compressor and a riser tube assembly that is located within the fluid container and communicated with the air compressor to feed the compressed air into the riser tube and flow upward through the riser tube along with the fluid in the fluid container. The airlift pumping mechanism is characterized by also comprising a sunken cavity that extends further downwards from the inner bottom surface of the fluid container and is located between and communicated with the air compressor and the riser tube assembly.

As described in the background of the invention, the submergence ratio is defined as $H_w/H_s$, wherein $H_w$ is the liquid level in the riser tube and $H_s$ is the total length of the tube. Owing to the sunken cavity extending further downwards from the inner bottom surface of the fluid container, the numerator $H_w$ and the denominator $H_s$ in the above mentioned representation is increased so that the value of the submergence ratio and therefore the pumping efficiencies of the pumping mechanism at various liquid levels are drastically increased. Especially when there is less fluid remained within the fluid container, that is, when the liquid level is lower, the submergence ratio will be increased more obviously. Compared with the prior art, the above described technical solutions of the invention will be able to obviously increase the pumping efficiency of the airlift pumping mechanism.

In an optimized embodiment of the above described airlift pumping mechanism, the riser tube assembly includes a riser tube and a bottom baffle connected to the bottom of the riser tube. When the riser tube assembly is in use, the bottom baffle is hermetically inserted into the sunken cavity, so that the sunken cavity is separated into a cavity body and a fluid intake channel, both of which are communicated with each other; the fluid within the fluid container flows through the fluid intake channel into the cavity body of the sunken cavity to mix with the compressed air from the air compressor.

The above described bottom baffle and sunken cavity can be of any suitable shape, so long as they are able to match with each other and form a hermetical combination. For example, the bottom baffle and/or the sunken cavity can be provided with silicone rubber to form a tight fit between them upon their insertion to each other. Moreover, vertical dimension of the bottom baffle may be less than that of the sunken cavity by way of example, in order to form one or more gaps between them at the moment of their insertion to each other. Fluid travels from the fluid intake channel through the one or more gaps and finally into the cavity body.

In an optimized embodiment of the above described airlift pumping mechanism, the airlift pumping mechanism also comprises a horizontally-oriented air inlet channel, which is provided between the cavity body of the sunken cavity and the air compressor to feed the compressed air from the air compressor into the cavity body.

In particular, the air inlet channel is located in the vicinity of the bottom of the cavity body of the sunken cavity and between the cavity body and the air compressor, so as to let the compressed air run from the air compressor into the cavity body.

In an optimized embodiment of the above described airlift pumping mechanism, the fluid container includes a heater provided on the inner bottom surface of the fluid container, and the riser tube is vertically located at the side of the heater. In a preferred embodiment of the above described airlift pumping mechanism, the heater is a flat heater, and the riser tube is located near the outer edge of the flat heater.

Take a brewing machine for example. "The riser tube is located near the outer edge of the flat heater" means that the riser tube is located at the side of the flat heater that is closer to the handle side of the brewing machine. Specifically, the riser tube of the pumping mechanism of the invention is able to be placed much closer to the sidewall of the container, since the riser tuber isn't provided with a fan-shaped air collector at its end, thereby not only opening up more options in arranging other components but also making fluid containers such as brewing machines better looking.

In an optimized embodiment of the above described airlift pumping mechanism, the riser tube includes a plurality of inner channels. Accordingly, the provision of more channels is able to maximize the pumping effect, without obviously increasing the structural complexity.

In an optimized embodiment of the above described airlift pumping mechanism, the fluid container also includes an infuser located near the top of the fluid container opposed to the heater, and the infuser is communicated with the top of the riser tube, along which the upward flow finally enter into the infuser under the action of the compressed air.

In an optimized embodiment of the above described airlift pumping mechanism, the air inlet channel is located at such a position and orientation that the distance between its lower edge and the bottom surface of the sunken cavity is equivalent to the diameter of the air inlet channel or is 3 mm, and that this distance is larger than that between the lower edge of the bottom baffle and the bottom surface of the sunken cavity. Accordingly, when the fluid container is drained after use, it is easy to expel liquid remaining inside the air inlet channel. Moreover, liquid drops remaining inside the sunken cavity would settle at the bottom of the sunken cavity rather than inside the air inlet channel, as a result the hygiene troubles faced by the pumping mechanisms in the prior art are avoided.

In another aspect of the invention, a fluid container is provided. The fluid container comprises the airlift pumping mechanism described in any one of previous technical solutions.

In yet another aspect of the invention, a brewing machine is provided. The brewing machine comprises the airlift pumping mechanism described in any one of previous technical solutions.

DETAILED DESCRIPTION

What has to be explained beforehand is that, technical solutions in the invention will be described below in connection with a brewing machine and an airlift pumping mechanism for the brewing machine. However, as should be readily understood by those skilled in the art, apparently technical solutions in the invention can be applied to other fluid containers such as coffee maker and other fields for example oil and gas exploration and wastewater treatment, etc, without altering the principles of the present disclosure. These changes don't depart from the principles of the invention and don't need any creative work, and therefore they are also intended to be within the scope of protection disclosed by the invention.

Specifically, the invention provides an airlift pumping mechanism for a brewing machine. The airlift pumping mechanism comprises an air compressor and a riser tube assembly which is located within the brewing machine and communicated with the air compressor to let the compressed air enter into the riser tube and flow upward through the riser tube assembly along with the fluid in the brewing machine.

The airlift pumping mechanism is characterized by also comprising a sunken cavity that extends further downwards from the inner bottom surface of the brewing machine and is located between and communicated with the air compressor and the riser tube assembly. Accordingly, the numerator $H_w$ and the denominator $H_s$ in the above mentioned representation is increased simultaneously so that the value of the submergence ratio and therefore the pumping efficiency of the pumping mechanism at various liquid levels are drastically increased, since the airlift pumping mechanism of the invention comprises a sunken cavity extending further downwards from the inner bottom surface of the brewing machine. Especially when there is less fluid remained within the brewing machine, that is, when the liquid level is lower, the submergence ratio will be increased more obviously. Therefore, compared with the prior art, the above described technical solutions of the invention will be able to increase the pumping efficiency of the airlift pumping mechanism.

Figure 4:
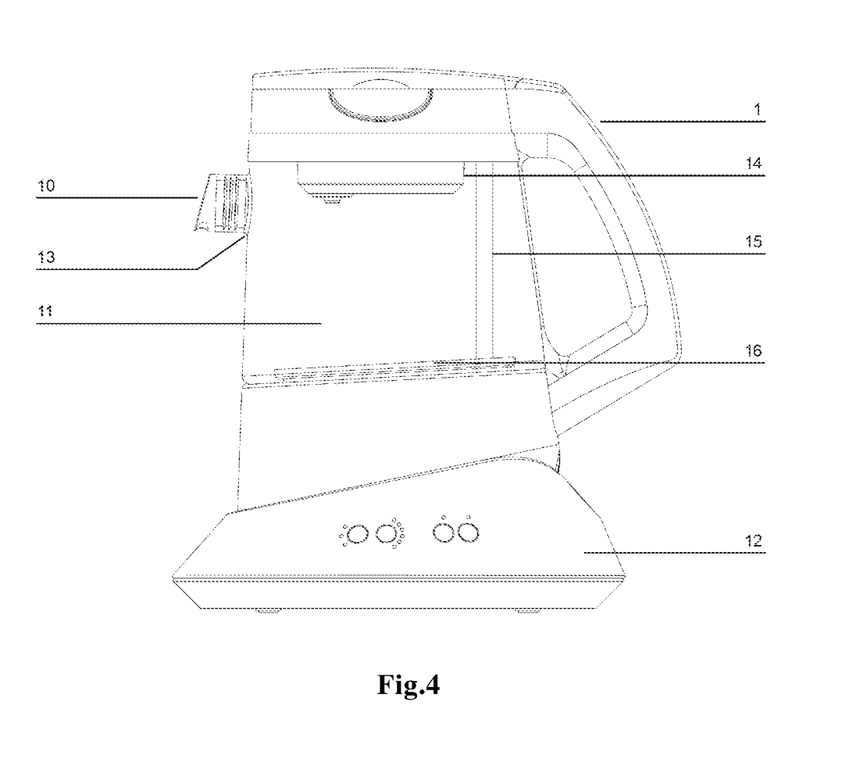
FIG. 4 is an illustration of the fluid container according to the present invention, wherein specifically the fluid container is a brewing machine.

The new pumping mechanism of the invention and its operational principles are described in detail below with reference to the accompanying figures. Referring first to FIG. 4, it illustrates a schematic view of the brewing machine 1 according to the invention. The brewing machine 1 includes a container body 11, an infuser 14, a riser tube 15 and a heater 16. In addition, the brewing machine 1 also includes a base 12, a spout 10, and an opening 13 located on the container body 11, through which fluid can flow into the spout 10. The skilled person will appreciate that the brewing machine 1 of the invention also includes many other components other than above described components, but there is no need to describe those components, for the technical solutions in the invention and their operations don't involve them.

Figure 5:
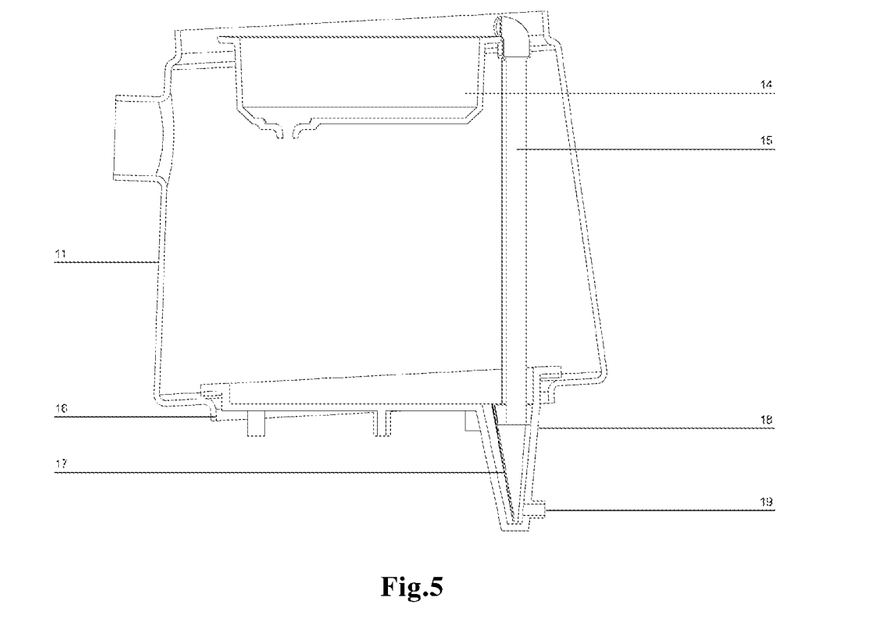
FIG. 5 is a side view of the airlift pumping mechanism according to the invention.

FIG. 5 shows a side view of the airlift pumping mechanism according to the invention. This airlift pumping mechanism is located in the brewing machine 1 shown in FIG. 1, and many unrelated components are omitted in FIG. 5 in order to more clearly reveal the core structures of the invention. The heater 16 is located at the bottom of the container. A sunken cavity 18 located at the right side of the heater 16 (according to the position and direction shown in FIG. 5) extends downwards from the bottom of the container body 11. A horizontally-oriented air inlet channel 19 is located slightly above the inner bottom surface of the sunken cavity 18 and its one end is connected with the air compressor (not shown in figures). As a non-limiting example, the distance between the bottom surface of the sunken cavity 18 and the lower edge of the air inlet channel 19 is 3 mm or is equivalent to the diameter of the air inlet channel 19. The bottom baffle 17 connected with the bottom end of the riser tube 15 is inserted into the sunken cavity 18. The top end of the riser tube 15 communicates with the infuser 14. Although as shown in FIG. 5 the sunken cavity 18 is downwardly wedge-shaped in cross-section, which however is merely exemplary in nature, those skilled in the art may chose as appropriate other shapes without departing from the principles of the invention.

Figure 6:
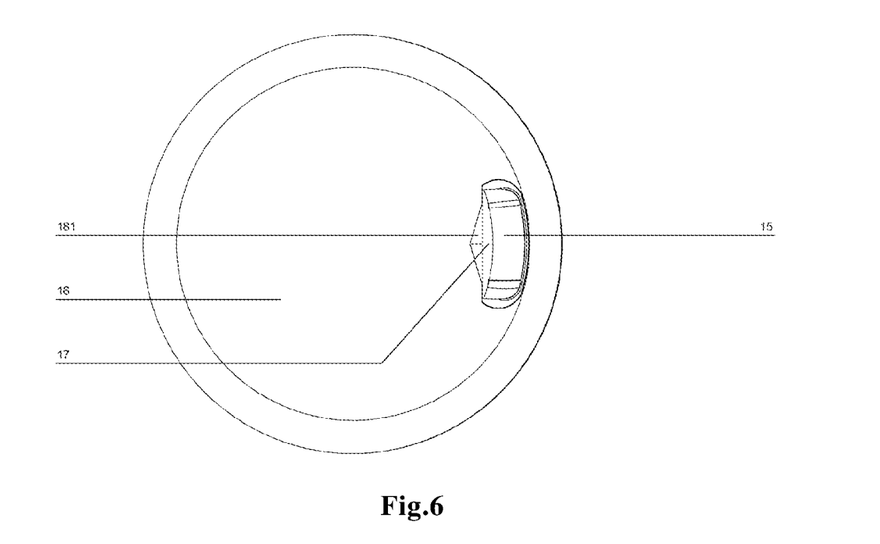
FIG. 6 is a top view of the airlift pumping mechanism according to the invention.

FIG. 6 is a top view of the airlift pumping mechanism according to the invention corresponding to FIG. 5 with the container body 11 and the infuser 14 removed for clarity. As shown in FIG. 6, when the bottom baffle 17 is inserted into the sunken cavity 18, an independent fluid intake channel 181 is separated within the sunken cavity 18 by the bottom baffle 17. In use, water in the container body 11 flows through the fluid intake channel 181, via a gap 182 (best shown in FIG. 11), and into the main body of the sunken cavity 18 in which the water mixes with the compressed air from the air inlet channel 19. Furthermore, as shown in FIG. 6, in addition to the fluid intake channel 181, in the insertion state, the riser tube 15 and the bottom baffle 17 completely cover the main body of the sunken cavity 18.

Figure 7:
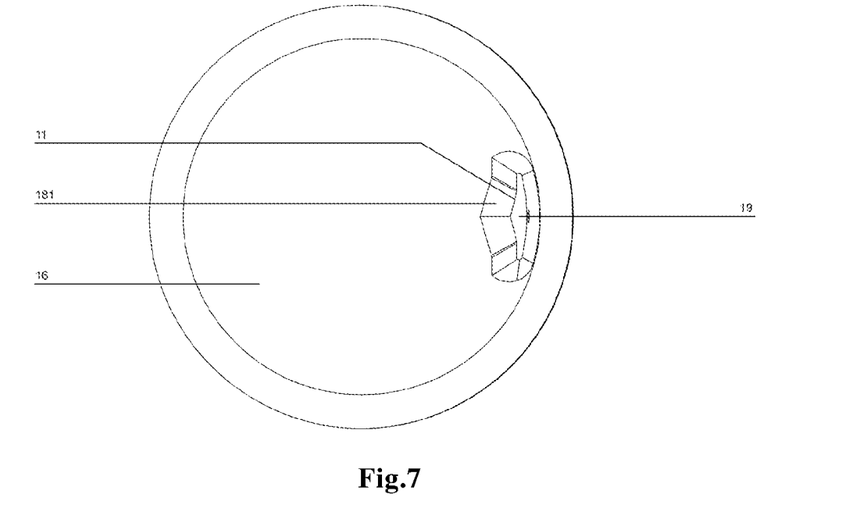
FIG. 7 is a top view of the airlift pumping mechanism according to the invention, wherein some components are omitted to show the inner structure more clearly.

FIG. 7 is another top view of the airlift pumping mechanism according to the invention corresponding to FIG. 6, wherein the riser tube 15 and the bottom baffle 17 are omitted to show the sunken cavity 18 and the air inlet channel 19 more clearly.

Figure 8:
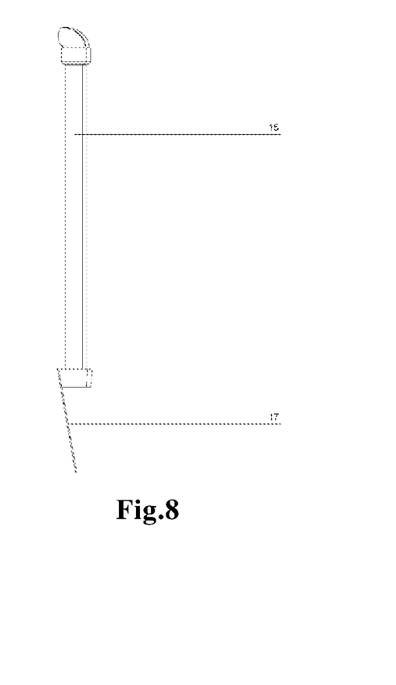
FIG. 8 is a side view of the riser tube assembly of the airlift pumping mechanism according to the invention.
Figure 9:
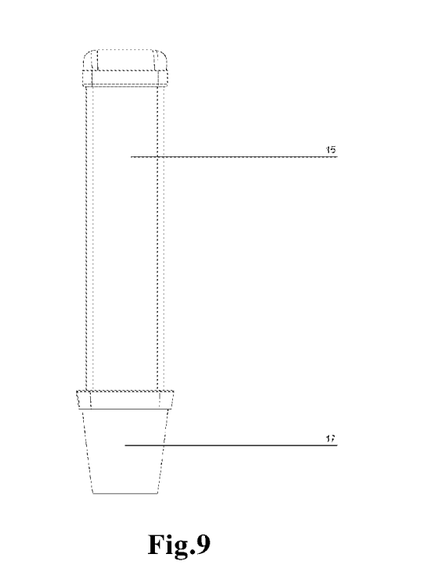
FIG. 9 is a front view of the riser tube assembly of the airlift pumping mechanism according to the invention.

FIG. 8 is a side view of the airlift pumping mechanism according to the invention. The riser tube assembly includes a riser tube 15 and a bottom baffle 17, and the riser tube assembly is designed to be detachable from the brewing machine 1 for easy handling and cleaning. In actual use, both the riser tube 15 and the bottom baffle 17 are fastened together as a single component by means of such as welding, clipping, etc. FIG. 9 is an elevation view of the riser tube of the airlift pumping mechanism according to the invention. Similar to the sunken cavity 18, although the bottom baffle 17 is wedge-shaped in cross section in FIGS. 8 and 9, which is merely exemplary in nature, those skilled in the art may choose other appropriate shapes without departing from the principles of the invention, as long as the bottom baffle 17 can be inserted into the sunken cavity 18 hermetically and divides the sunken cavity 18 into a fluid intake channel 181 and a main body, both parts communicate with one another.

Figure 10:
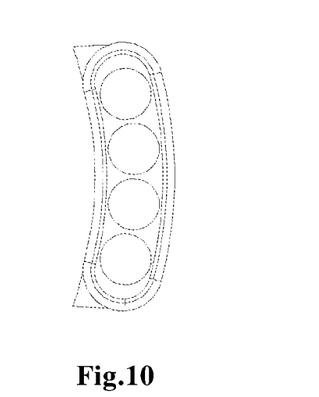
FIG. 10 is a bottom view of the riser tube of the airlift pumping mechanism according to the invention.

FIG. 10 is a bottom view of the airlift pumping mechanism according to the invention. As shown, the riser tube 15 can include one or more internal channels. In this embodiment, the riser tube 15 is illustratively shown to include four internal channels in order to get a better pumping effect.

Figure 11:
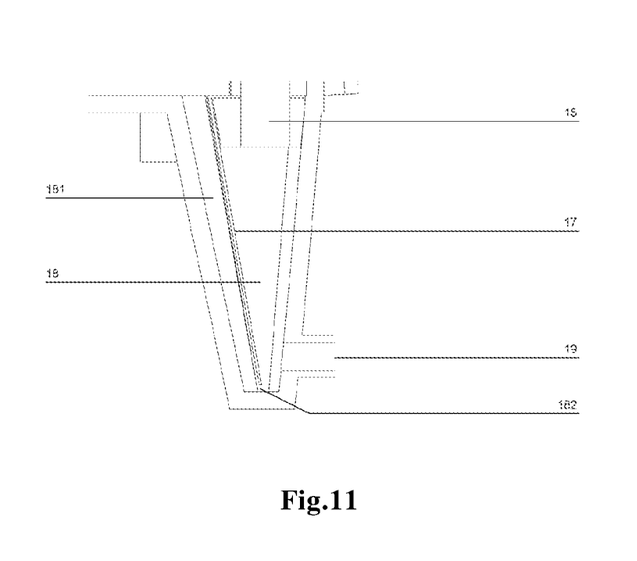
FIG. 11 is a partially enlarged side view of the airlift pumping mechanism according to the invention, wherein the related details of the sunken cavity are shown.

FIG. 11 is a partially enlarged side view of the airlift pumping mechanism according to the invention, wherein the related details around the sunken cavity 18 are shown. The bottom baffle 17 is shaped in such a way that when inserted into the sunken cavity 18, both parts will form a tight fit along the sidewalls of the sunken cavity 18 while keeping the sunken cavity 18 and the container body 11 in communication with each other as well. The tight fit between the bottom baffle 17 and the sunken cavity 18 is achieved by seals and coatings such as silicon rubber. The bottom baffle 17 vertically extends downwards and forms a gap 182 at the bottom of the sunken cavity 18. The gap 182 communicates the fluid intake channel 181 and the main body of the sunken cavity 18, and the fluid intake channel 181 communicates with the inside of the container body 11. Thus, water or other fluid from the container body 11 can pass through the fluid intake channel 181, via the gap 182, and into the main body of the sunken cavity 18. It should be noted at this point that the height of the gap 182 should be slightly less than the distance between the lower edge of the air inlet channel 19 and the bottom of the sunken cavity 18. In other words, taking the bottom/bottom surface of the sunken cavity 18 as the benchmark, the lower edge of the air inlet channel 19 should be higher than the lower edge of the bottom baffle 17. Otherwise, the compressed air from the air inlet channel 19 will somewhat obstruct the water flowing via the gap 182 into the main body of the sunken cavity 18. Also residual liquid drops will be able to flow into the air inlet channel 19 after use, in which all of these are extremely undesirable. Of course, the difference in their heights shall not be too large, or else it will impact the lifting effect of the compressed air on the flowing water and therefore reduce the pumping efficiency.

Because a fan-shaped air collector is not provided in the present invention, the riser tube 15 is able to be placed closer to the sidewall of the container body 11, thereby opening up more options in general structural configuration, such as larger diameter and internal volume for the infuser 14. Also, as particularly shown in FIGS. 6-9, the sunken cavity 18 is able to be made narrower to reduce its internal volume and increase the pumping efficiency, owing to the flat plate structure of the bottom baffle 17 inserted in the sunken cavity 18.

Figure 12:
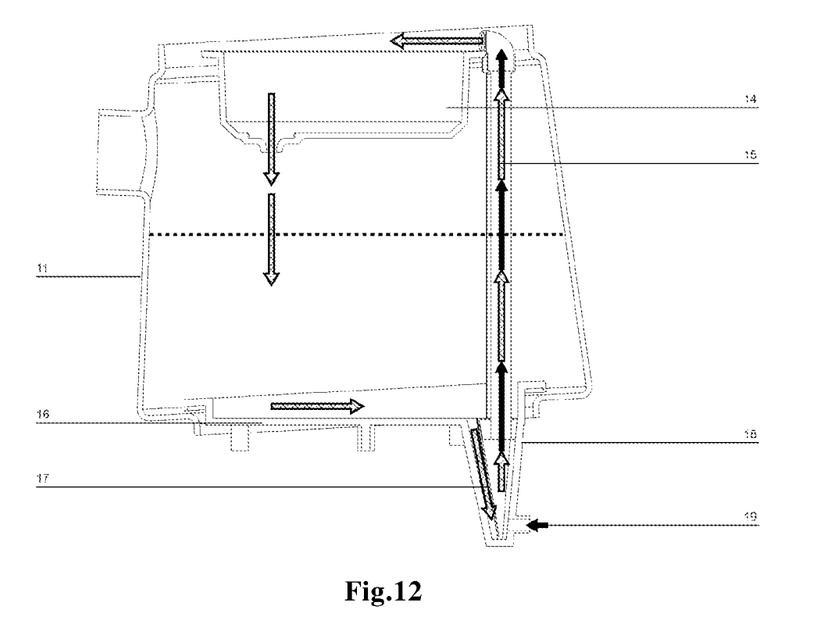
FIG. 12 is a side view of the airlift pumping mechanism according to the invention, wherein the fluid flow path and the air flow path during operation are shown.
Figure 13:
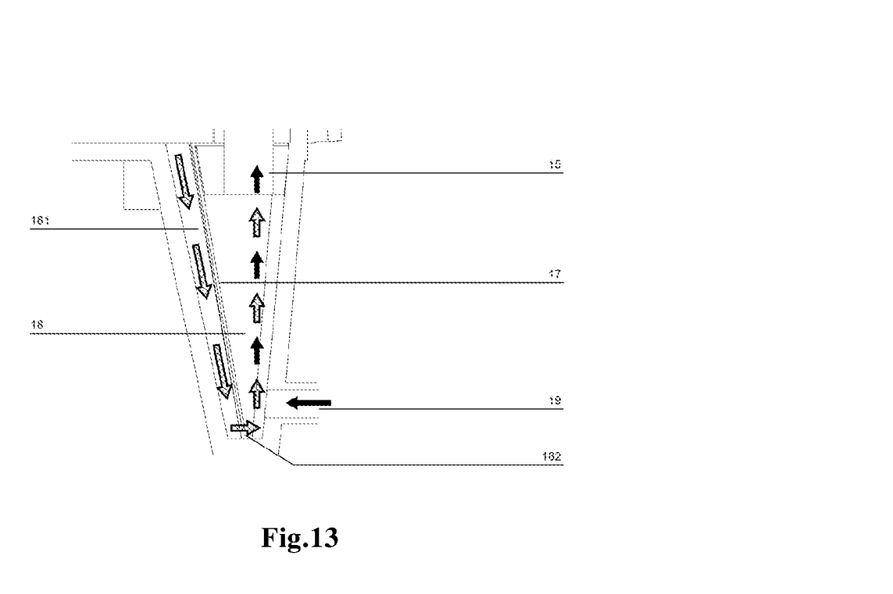
FIG. 13 is a partially enlarged side view of the airlift pumping mechanism according to the invention, wherein the fluid flow path and the air flow path in the sunken cavity during operation are shown.

FIG. 12 is a side view of the airlift pumping mechanism according to the invention, wherein the water flow path and air flow path during operation are shown. In FIG. 12, the water flow path is indicated by white arrows, the air flow path is indicated by black arrows, and the liquid level is indicated by a broken line. FIG. 13 is a partially enlarged side view of the airlift pumping mechanism according to the invention, wherein the water flow path and air flow path in the sunken cavity during operation are shown.

When the air from the horizontally-oriented air inlet channel 19 is injected into the sunken cavity 18, it mixes with the fluid in the cavity and therefore the buoyancy force of the mixture increases, thereby creating an upward lifting force. As the bottom baffle 17 maintains a tight fit with the sidewalls of the sunken cavity 18, the liquid-air mixture would be pushed up the riser tube 15 through its internal channels. The elevated water would exit the riser tube 15 to enter into the infuser 14, and would eventually return to the container body 11 with the increase of the liquid level in the infuser 14. Water from the container body 11 will flow down the fluid intake channel 181 of the sunken cavity and pass through the gap 182 to fill the sunken cavity 18.

Figure 14:
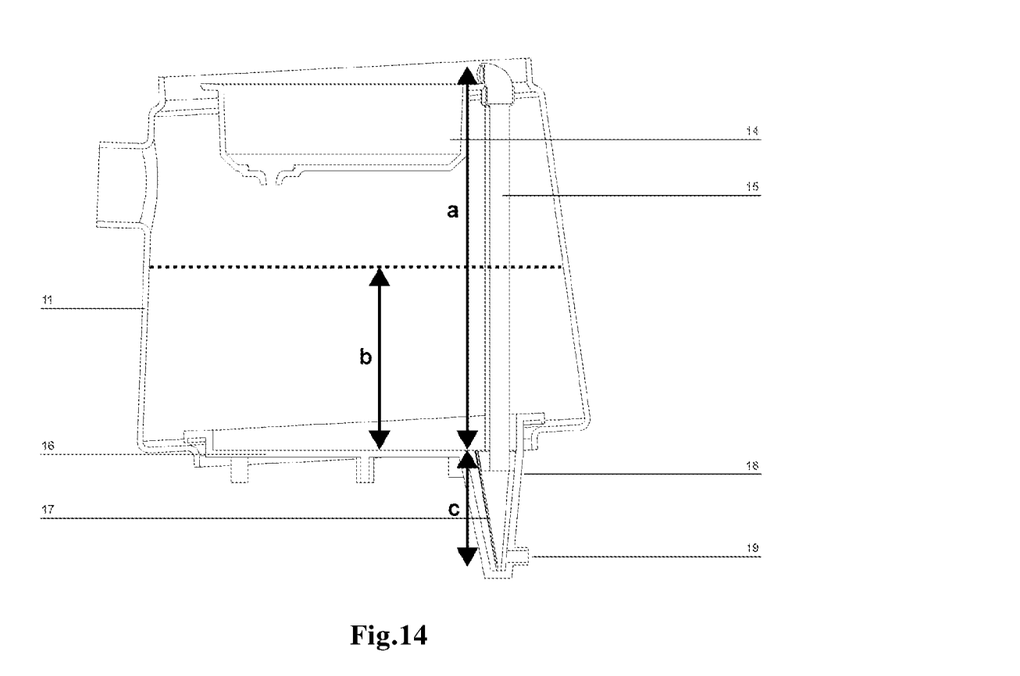
FIG. 14 is a side view corresponding to FIG. 12, wherein a variety of dimension parameters related to the pumping efficiency are shown.

As previously discussed, the pumping efficiency of the airlift pumping mechanism depends on the submergence ratio. As for the pumping mechanism of the invention, the dimensions of the sunken cavity 18 need to be considered to calculate the submergence ratio. FIG. 14 is a side view corresponding to FIG. 12, wherein various dimension parameters related to the pumping efficiency are shown. Specifically, FIG. 14 shows a variety of dimensions used to calculate the submergence ratio, and Table 1 shows the calculation results derived from practical example dimensions. It can be seen from Table 1 that with the addition of the sunken cavity 18, the submergence ratio of all listed liquid levels have increased, especially those at low liquid levels when considering the absolute percentage increase. That is to say, the lower the liquid levels are, the more the submergence ratio increases; and the deeper the sunken cavity 18 is, the more the submergence ratio increases. Of course, it should be readily understood that, the overall structural design should be taken into account when choosing the depth of the sunken cavity 18, as such the depth can't be increased infinitely just for the sole purpose of achieving a better pumping efficiency.

TABLE 1

| Length of the riser tube (mm) | Liquid level (mm) | Depth of the cavity (mm) | Original submergence ratio (mm) | New submergence ratio e = (b + c)/(a + c) | Difference % e-d |
|---|---|---|---|---|---|
| 140 | 60 | 40 | 42.86% | 55.56% | 12.70% |
| 140 | 50 | 40 | 35.71% | 50.00% | 14.29% |
| 140 | 40 | 40 | 28.57% | 44.44% | 15.87% |
| 140 | 30 | 40 | 21.43% | 38.89% | 17.46% |
| 140 | 20 | 40 | 14.29% | 33.33% | 19.05% |

The horizontally-oriented air inlet channel 19 is located at a small distance above the bottom surface of the sunken cavity 18. Therefore, when the brewing machine 1 is drained after use by pouring, it is easy to expel liquid remaining inside the air inlet channel 19. Also, liquid drops remaining inside the sunken cavity 18 would settle at the bottom of the sunken cavity 18 rather than inside the air inlet channel 19, as a result the hygiene problems faced by the pumping mechanisms in the prior art are avoided.

So far, though the technical solutions of the present invention has been described in connection with the preferred embodiments shown in the accompanying figures, it should be readily appreciated that the protection scope of the invention is obviously not limited to these specific embodiments. Without departing from the principles of the invention, equivalent alterations to or substitutions of related technical features can be made by those skilled in the art, these altered or substituted technical solutions are intended to be within the scope of the invention.

The invention claimed is:

1. An airlift pumping mechanism for a brewing machine comprising an air compressor and a riser tube assembly, wherein the riser tube assembly is located within the fluid container and communicated with the air compressor to feed a compressed air into the riser tube assembly and flow upward through the riser tube assembly along with a fluid in the fluid container, characterized in that, the airlift pumping mechanism further comprises a sunken cavity that extends downwards from an inner bottom surface of the fluid container and is located between and communicated with the air compressor and the riser tube assembly the riser tube assembly includes a riser tube and a bottom baffle connected to the bottom of the riser tube, an air inlet channel, which is provided between the cavity body of the sunken cavity and the air compressor to feed the compressed air from the air compressor into the cavity body, and the fluid container includes a heater provided on the inner bottom surface of the fluid container.

2. The airlift pumping mechanism as set forth in claim 1, wherein the bottom baffle is hermetically inserted into the sunken cavity when the riser tube assembly is in use, so that the sunken cavity is separated into a cavity body and a fluid intake channel which are communicated with each other, and the fluid within the fluid container flows through the fluid intake channel into the cavity body of the sunken cavity to mix with the compressed air from the air compressor.

3. The airlift pumping mechanism as set forth in claim 2, characterized in that, air inlet channel is horizontally oriented.

4. The airlift pumping mechanism as set forth in claim 3, characterized in that, the fluid container includes a heater provided on the inner bottom surface of the fluid container, and the riser tube is vertically located at a side of the heater.

5. The airlift pumping mechanism as set forth in claim 4, characterized in that, the heater is a flat heater, and the riser tube is located near the outer edge of the flat heater.

6. The airlift pumping mechanism as set forth in claim 5, characterized in that, the riser tube includes a plurality of internal channels.

7. The airlift pumping mechanism as set forth in claim 6, characterized in that, the fluid container further includes an infuser located near the top of the fluid container opposed to the flat heater, and the infuser is communicated with the top of the riser tube, so that the upward flow finally enters into the infuser through the riser tube under the action of the compressed air.

8. The airlift pumping mechanism as set forth in claim 7, characterized in that, the horizontally-oriented air inlet channel is located so that a distance between a lower edge of the horizontally-oriented air inlet channel and the bottom surface of the sunken cavity is equivalent to the diameter of the horizontally-oriented air inlet channel or is 3 mm, and that the distance is larger than another distance between the lower edge of the bottom baffle and the bottom surface of the sunken cavity.

9. The airlift pumping mechanism as set forth in claim 3, characterized in that, the horizontally-oriented air inlet channel is located so that a distance between a lower edge of the horizontally-oriented air inlet channel and the bottom surface of the sunken cavity is equivalent to the diameter of the horizontally-oriented air inlet channel or is 3 mm, and that the distance is larger than another distance between the lower edge of the bottom baffle and the bottom surface of the sunken cavity.

10. The airlift pumping mechanism as set forth in claim 4, characterized in that, the horizontally-oriented air inlet channel is located so that a distance between a lower edge of the horizontally-oriented air inlet channel and the bottom surface of the sunken cavity is equivalent to the diameter of the horizontally-oriented air inlet channel or is 3 mm, and that the distance is larger than another distance between the lower edge of the bottom baffle and the bottom surface of the sunken cavity.

11. The airlift pumping mechanism as set forth in claim 5, characterized in that, the horizontally-oriented air inlet channel is located so that a distance between a lower edge of the horizontally-oriented air inlet channel and the bottom surface of the sunken cavity is equivalent to the diameter of the horizontally-oriented air inlet channel or is 3 mm, and that the distance is larger than another distance between the lower edge of the bottom baffle and the bottom surface of the sunken cavity.

12. The airlift pumping mechanism as set forth in claim 6, characterized in that, the horizontally-oriented air inlet channel is located so that a distance between a lower edge of the horizontally-oriented air inlet channel and the bottom surface of the sunken cavity is equivalent to the diameter of the horizontally-oriented air inlet channel or is 3 mm, and that the distance is larger than another distance between the lower edge of the bottom baffle and the bottom surface of the sunken cavity.

* * * * *